(12) United States Patent
Wincek et al.

(10) Patent No.: US 10,940,806 B2
(45) Date of Patent: *Mar. 9, 2021

(54) AFTERMARKET HEAD UNIT INTERFACE AND PROTOCOL CONVERTER CARTRIDGE

(71) Applicant: AAMP of Florida, Inc., Clearwater, FL (US)

(72) Inventors: Nathaniel Lee Wincek, New Port Richey, FL (US); Michael Lake, Seminole, FL (US)

(73) Assignee: AAMP of Florida, Inc., Clearwater, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/591,794

(22) Filed: Oct. 3, 2019

(65) Prior Publication Data

US 2020/0094751 A1 Mar. 26, 2020

Related U.S. Application Data

(63) Continuation of application No. 15/991,883, filed on May 29, 2018, now Pat. No. 10,464,500.
(Continued)

(51) Int. Cl.
*H04B 1/08* (2006.01)
*B60R 11/02* (2006.01)
(Continued)

(52) U.S. Cl.
CPC ...... *B60R 11/0205* (2013.01); *B60H 1/00878* (2013.01); *B60R 11/0211* (2013.01);
(Continued)

(58) Field of Classification Search
CPC ......... B60R 11/0205; B60R 2011/0005; B60R 2011/0075; B60R 2011/027;
(Continued)

(56) References Cited

U.S. PATENT DOCUMENTS

| 5,719,551 A | 2/1998 | Flick |
| 6,011,460 A | 1/2000 | Flick |

(Continued)

FOREIGN PATENT DOCUMENTS

| CA | 2320248 A1 | 8/1999 |
| CA | 2426670 A1 | 7/2003 |

(Continued)

OTHER PUBLICATIONS

Automotive Data Solutions Inc, "Blade Update: Install Guide Blade-AL(DL)-TL5-EN", Dec. 2012 (27 pages).

*Primary Examiner* — Richard A Goldman
(74) *Attorney, Agent, or Firm* — Michael Best & Friedrich LLP (57) ABSTRACT

An aftermarket vehicle head unit integration cartridge for use with an aftermarket head unit is provided. The aftermarket head unit preferably includes a dedicated slot for insertion of the cartridge. The cartridge preferably supports communication between a plurality of electronic components in the aftermarket head unit and a plurality of electronic components in the vehicle. The plurality of electronic components in the aftermarket head unit may include, for example, an audio processing system, a video processing system, an analog I/O and/or a digital I/O. and/or a plurality of electronic components. The plurality of electronic components in the vehicle may include an audio system, an analog I/O, a digital I/O/databus, and/or a steering wheel control unit. The cartridge may include a flashable memory for use in reconfiguring the cartridge. The cartridge may be configured to capture and condition the signals from at least one of the plurality of the vehicle-based electronic components. The conditioned signals from the vehicle-based electronic components may be conditioned for use by the aftermarket head unit.

20 Claims, 8 Drawing Sheets

Related U.S. Application Data (60) Provisional application No. 62/512,100, filed on May 29, 2017.

(51) Int. Cl.
*B60H 1/00* (2006.01)
*G06F 13/42* (2006.01)
*B60R 11/00* (2006.01)

(52) U.S. Cl.
CPC ... *B60R 11/0264* (2013.01); *B60R 2011/0005* (2013.01); *B60R 2011/0075* (2013.01); *B60R 2011/027* (2013.01); *B60R 2011/0288* (2013.01); *G06F 13/4282* (2013.01)

(58) Field of Classification Search
CPC ........ B60R 2011/0288; B60H 1/00878; B60H 1/0211; B60H 1/0264; G06F 12/4282; H04B 1/082; G04L 67/12; B61R 11/02; B61R 11/0205; B61R 11/0258
USPC .......................................................... 701/36
See application file for complete search history.

(56) References Cited

U.S. PATENT DOCUMENTS

| | | | |
|---|---|---|---|
| 6,243,004 B1 | 6/2001 | Flick | |
| 6,249,216 B1 | 6/2001 | Flick | |
| 6,275,147 B1 | 8/2001 | Flick | |
| 6,297,731 B1 | 10/2001 | Flick | |
| 6,346,876 B1 | 2/2002 | Flick | |
| 6,392,534 B1 | 5/2002 | Flick | |
| 6,529,124 B2 | 3/2003 | Flick | |
| 6,696,927 B2 | 2/2004 | Flick | |
| 6,756,885 B1 * | 6/2004 | Flick | B60R 25/1018 340/426.1 |
| 6,756,886 B2 | 6/2004 | Flick | |
| 6,771,167 B1 * | 8/2004 | Flick | B60R 16/03 307/10.2 |
| 6,812,829 B1 | 11/2004 | Flick | |
| 6,924,750 B2 * | 8/2005 | Flick | B60R 25/102 340/989 |
| 6,956,952 B1 * | 10/2005 | Riggs | H04B 1/082 307/10.1 |
| 7,010,402 B2 * | 3/2006 | Flick | B60R 25/00 307/10.1 |
| 7,015,830 B2 | 3/2006 | Flick | |
| 7,031,826 B2 | 4/2006 | Flick | |
| 7,046,126 B2 | 5/2006 | Flick | |
| 7,061,137 B2 | 6/2006 | Flick | |
| 7,068,153 B2 | 6/2006 | Flick | |
| 7,205,679 B2 | 4/2007 | Flick | |
| 7,224,083 B2 | 5/2007 | Flick | |
| 7,369,936 B2 * | 5/2008 | Flick | B60R 16/03 307/10.6 |
| 7,378,945 B2 | 5/2008 | Flick | |
| 7,489,233 B2 | 2/2009 | Flick | |
| 7,501,937 B2 | 3/2009 | Flick | |
| 8,856,780 B2 * | 10/2014 | Boulais | G06F 8/654 717/178 |
| 9,619,114 B2 * | 4/2017 | Rutledge | G06F 3/0484 |
| 9,736,588 B2 * | 8/2017 | Rutledge | G06F 3/165 |
| 2002/0154435 A1 | 10/2002 | Flick | |
| 2004/0017284 A1 * | 1/2004 | Flick | G07C 9/00182 340/426.1 |
| 2006/0129282 A1 | 6/2006 | Flick | |
| 2006/0129284 A1 | 6/2006 | Flick | |
| 2007/0108788 A1 * | 5/2007 | Shalam | B60R 11/0235 296/37.15 |
| 2008/0030316 A1 * | 2/2008 | Flick | G08G 1/20 340/466 |
| 2008/0246850 A1 * | 10/2008 | Marlowe | H04B 1/205 348/222.1 |
| 2009/0010448 A1 * | 1/2009 | Voto | H04B 1/082 381/86 |
| 2009/0062982 A1 * | 3/2009 | Obata | B62D 1/046 701/36 |
| 2009/0075624 A1 * | 3/2009 | Cox | H04B 1/082 455/345 |
| 2009/0079552 A1 * | 3/2009 | Flick | B60R 25/209 340/426.17 |
| 2010/0233965 A1 * | 9/2010 | Fukuoka | H04B 7/0617 455/67.11 |
| 2011/0046874 A1 * | 2/2011 | Wirola | H04L 67/18 701/532 |
| 2011/0295463 A1 * | 12/2011 | Daly | H04B 1/082 701/36 |
| 2013/0197753 A1 * | 8/2013 | Daly | H04B 1/202 701/36 |
| 2015/0026376 A1 * | 1/2015 | Scanlan | H01R 13/6473 710/300 |
| 2015/0100633 A1 * | 4/2015 | Barrett | H04L 67/04 709/204 |
| 2015/0181417 A1 * | 6/2015 | Snider | H04L 67/42 370/338 |
| 2015/0199968 A1 * | 7/2015 | Singhal | G10L 25/48 704/251 |
| 2016/0274882 A1 * | 9/2016 | Fazi | H04L 67/34 |
| 2016/0360019 A1 * | 12/2016 | Ellis | G06F 1/324 |
| 2017/0282953 A1 * | 10/2017 | Olson | H03K 17/9622 |
| 2018/0339662 A1 * | 11/2018 | Wincek | B60R 11/0205 |

FOREIGN PATENT DOCUMENTS

| | | |
|---|---|---|
| CA | 2415023 A1 | 8/2003 |
| CA | 2415038 A1 | 8/2003 |
| CA | 2415041 A1 | 6/2004 |

* cited by examiner

AFTERMARKET HEAD UNIT INTERFACE AND PROTOCOL CONVERTER CARTRIDGE

CROSS-REFERENCE TO RELATED APPLICATION(S)

This application is a continuation of U.S. patent application Ser. No. 15/991,883, filed on May 29, 2018, which claims priority to U.S. Provisional Patent Application No. 62/512,100, filed on May 29, 2017, the entire contents of each of which are fully incorporated herein by reference.

FIELD OF THE DISCLOSURE

This application relates to replacement vehicle head units (referred to hereinafter as "aftermarket head units") for use in replacing original equipment manufacturer ("OEM") vehicle head units (referred to hereinafter as "OEM head units".) Specifically, this application relates to enabling legacy vehicle components and settings to operate seamlessly with the aftermarket head units.

BACKGROUND OF THE DISCLOSURE

The increasing pace of technology development deeply affects the automobile aftermarket parts industry. The life cycle of automobile aftermarket parts reflects constantly-changing attempts to take advantage of newly-developed technology as it applies to legacy vehicles. In particular, car audio "infotainment" systems are developing and changing at a pace that outstrips the development of many other devices.

Specifically, OEM and aftermarket head units, which may control the vehicle's information and entertainment media, have rapidly developed in recent years. Such head units control functionality related to, for example, proprietary smartphone integration technology, non-proprietary smartphone integration technology, AM/FM radio, satellite radio, CDs, DVDs, MP3, GPS navigation, Bluetooth, driver safety systems including cameras and sensors, etc. Furthermore, head units may enable precise control of volume, band, frequency, speaker balance, speaker fade, bass, treble, Equalization (EQ), etc. More recent head units also control other vehicular functions such as door chimes, vehicle configuration settings, vehicle data such as trouble warnings and odometer information and may even serve as a secondary instrument panel.

OEM head units are typically factory-configured to interface with a vehicle's various OEM system components and settings. For example, OEM head units are typically factory-configured to interface with, inter alia, a vehicle's DATA BUS protocol.

Furthermore, OEM head units are typically factory-configured to receive instructions from OEM peripheral components—e.g., steering wheel mounted controls or parking sensor status. Such instructions may be received from the OEM peripheral components via a standard factory harness. Such a factory harness may typically be used for connecting the head unit to the vehicle's electrical system.

Universal aftermarket head units, which are not typically manufactured for a particular vehicle, however, are not factory-configured to interface with various OEM settings. For example, aftermarket head units are not factory-configured to interface with a DATA BUS of a vehicle into which the aftermarket head unit is installed.

Furthermore, aftermarket head units are not typically factory-configured to receive and process instructions from OEM vehicle components through the standard factory head unit harness.

It would be desirable to provide a memory-configurable cartridge for plugging in to an aftermarket head unit such that, following configuration of the cartridge and installation of the cartridge in an installed aftermarket head unit, the aftermarket head unit is configured to communicate with the vehicle and the peripherals in the vehicle in a similar or greater capacity than the OEM head unit.

SUMMARY OF THE DISCLOSURE

A cartridge for use with an aftermarket vehicle head unit (alternatively referred to herein as a "aftermarket head unit", "head unit" or "radio") is provided.

The kit may also include a cartridge comprising a flashable memory. For the purposes of this application, the cartridge containing flashable memory may be referred to herein as a flashable cartridge. For the purposes of this application, flashable memory should be understood to refer to an electronic (solid-state) non-volatile computer storage medium than can be electrically erased and reprogrammed. Because of its mechanical shock resistance, high durability, ability to withstand high pressure and temperature and fast read-access times, flash memory is often used to store configuration data in numerous mobile digital products. In the embodiments disclosed herein, the cartridge may preferably be inserted into a dedicated slot in the aftermarket vehicle head unit.

It should be noted that some of the embodiments may include the cartridge and not the aftermarket head unit itself, while some embodiments may include the cartridge and the aftermarket head unit.

In typically all embodiments described herein, the kit may be configured to enable use of an aftermarket vehicle head unit within an automobile, while preferably maintaining OEM (Original Equipment Manufacturer) features such as steering wheel audio controls, voice controls, factory Bluetooth integration, satellite radio, factory amplifier operation and settings, OEM telematics (i.e., OnStar®, Sync®, etc.) USB media players, rear seat entertainment systems, safety alerts, camera systems, sensor systems and/or navigation.

The flashable cartridge may be configured to capture (through wired and/or wireless communication) and condition, preferably at a location within the aftermarket vehicle head unit and/or within the cartridge itself, some of the signals from electronic components within the vehicle. These components may include an audio system, a video system, an analog I/O, and a digital I/O/databus. The cartridge may facilitate communication between the components within the vehicle and the components within the head unit. The signals may be transmitted along one or more of the DATA BUS within the vehicle, the standard head unit harness, a separate wired line from the steering wheel controls, a wireless connection to the steering wheel controls, or from any other suitable signal path.

The unconditioned signals from the vehicle components may be conditioned by the cartridge for use by the head unit. Also, unconditioned signals from the head unit may be conditioned by the cartridge for use by the vehicle components.

In some embodiments, a port in a cartridge for receiving signals from a DATA BUS in a vehicle and the port for receiving signals from a standard head unit harness in a vehicle may be the same port. In certain embodiments, a port for receiving signals from a DATA BUS in a vehicle and the port for receiving signals from a standard head unit harness in a vehicle may be different ports.

In some embodiments, the flashable cartridge is configured to intercept, or otherwise capture, at a location within the aftermarket vehicle head unit and/or at a location within the cartridge itself, the signals from the DATA BUS and the signals from the steering wheel control unit or other vehicle component system. The flashable cartridge may be further configured to translate the signals from the DATA BUS and/or the signals from the steering wheel control unit or other vehicle component system such that the translated signals from the DATA BUS and the translated signals from the steering wheel control unit or other vehicle component system are conditioned for use by the aftermarket head unit.

The capture may occur through capture of a wired transmission of each of the signals. The capture may occur through capture of a wireless transmission of each of the signals.

In certain embodiments, the flashable cartridge is configured to intercept, at a location within the aftermarket head unit, the signals from the DATA BUS and the signals from the standard head unit harness, and translate the signals, from the DATA BUS and the signals from the standard head unit harness such that the translated signals from the DATA BUS and the translated signals from the standard head unit harness are, following translation, if necessary, conditioned for use by the aftermarket head unit.

Some embodiments may utilize one or more flashable cartridge(s). In some embodiments, the flashable cartridge may include a single outer shell, but may be split, internally, into two modules. Each of the modules may preferably handle different tasks. For example, one of the modules may include steering wheel interface functionality, while a second may provide a head unit replacement interface module.

In certain embodiments, the flashable cartridge may include ports for coupling a standard (or other) head unit wiring harness and/or a connection associated with the DATA BUS to the relevant internal portions of the aftermarket head unit.

In some embodiments, the flashable cartridge may include ports or sockets for coupling to a wire connector associated with a handheld, or other, device such as an iPhone®. Such ports may preferably include the necessary hardware for coupling to such a handheld, or other, device. In certain embodiments, the ports may include an USB (Universal Serial Bus) 2.0 socket. In other embodiments, the ports may include an USB (Universal Serial Bus) 3.0 socket. It should be noted that some embodiments may preferably include connections, and/or hardware sockets that can be upgraded, changed or otherwise reconfigured. Some reconfigurations may reconfigure the cartridge to adapt to new or future technologies. Such future technologies may not have been developed at the initial in-use date of the cartridge.

In order to support reconfiguration of the cartridge, firmware on the cartridge may preferably enable a user to access cartridge settings via the touchscreen of the aftermarket head unit into which the cartridge is inserted and/or installed. For example, once the cartridge is installed in a double DIN head unit (180 mm×100 mm), a cartridge configuration display may selectably appear on the head unit display. The cartridge configuration display may preferably enable a user to utilize the screen of the double DIN head unit to set various settings of the cartridge such as the head unit in which the cartridge is installed, the vehicle in which the cartridge is installed, the connector and/or signal path by which the cartridge is receiving signals or any other suitable settings that are appropriate for configuration of the cartridge. In addition, the cartridge memory may preferably enable a user to flash the cartridge with updated firmware and/or other updated software. Either through the head unit or through a separate remote signal path (wired or wireless), the cartridge may preferably be reconfigurable without even removing the cartridge from the head unit. Alternatively, the cartridge may preferably be reconfigurable after removing from the head unit.

With respect to the hardware sockets embedded in the flashable cartridge, it should be noted that the software and/or firmware associated with, and possible required by, such sockets may preferably be flashable as well. Accordingly, in some embodiments, the flashable cartridge may preferably be updated by electronically (wired or wirelessly) coupling the flashable cartridge to a computer in order to download relevant software associated with connections, sockets, new and/or legacy safety features, vehicle cameras and/or vehicle camera settings.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DISCLOSURE

Figure 1:
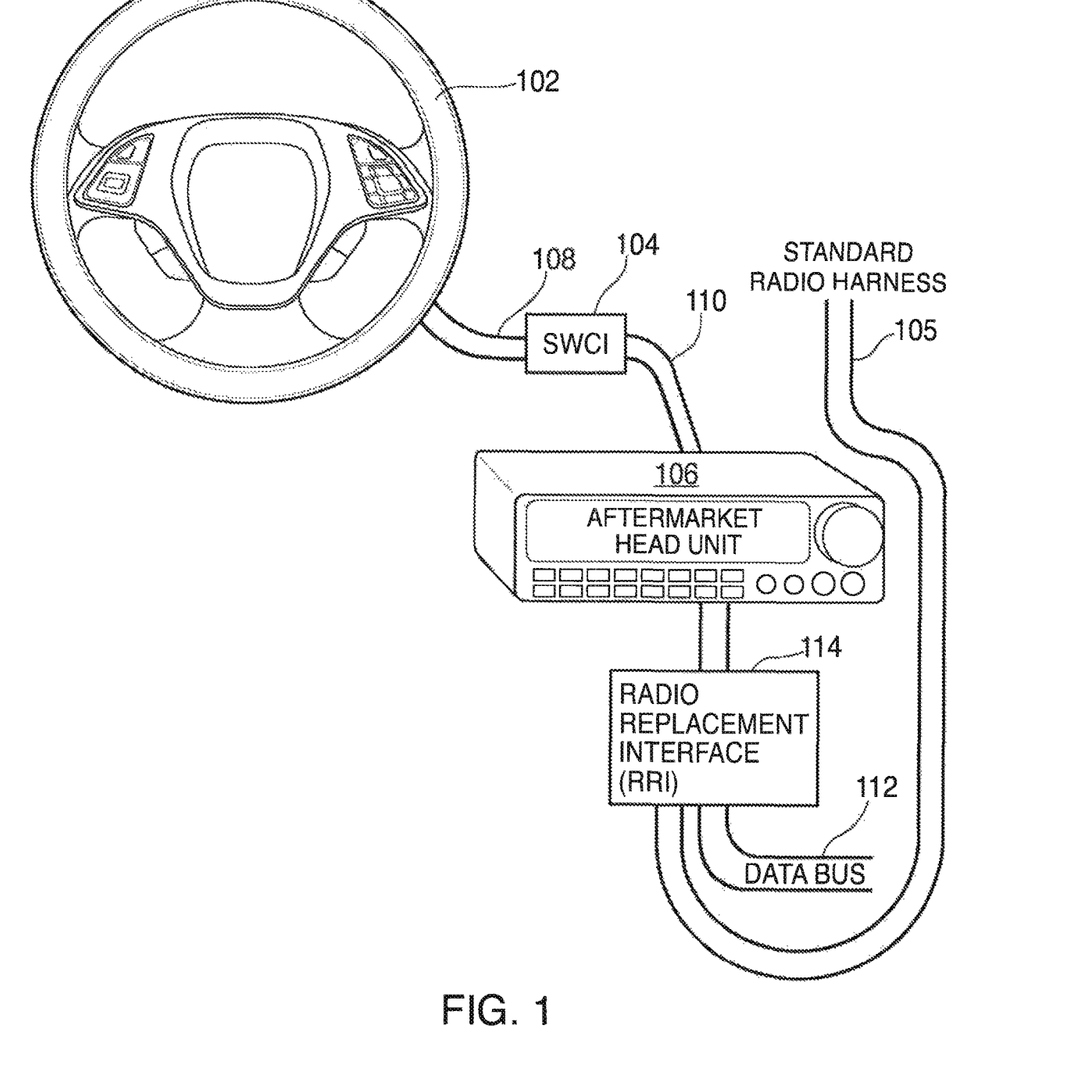
FIG. 1 shows a conventional arrangement of certain vehicle components in a vehicle equipped with an aftermarket head unit.

FIG. 1 shows a conventional arrangement of certain vehicle components in a vehicle equipped with an aftermarket head unit 106. These components include a steering wheel 102 with various steering wheel controls. These components also include a standard factory harness 105 for connecting to a vehicle's electrical system.

These components also include a hard-wired connection between steering wheel 102 and aftermarket head unit 106. The hard-wired connection may include a first portion 108 and a second portion 110. First portion 108 may couple the steering wheel controls located on steering wheel 102 and steering wheel control interface 104 such that signals generated at the steering wheel controls may be input into the steering wheel control interface 104. Steering wheel control interface 104 may preferably translate the signals generated by the steering wheel controls for use by the aftermarket head unit 106. Following receipt of, and subsequent translation of, the signals from the steering wheel control at steering wheel control interface 104, steering wheel control interface 104 preferably transmits the translated signals to aftermarket head unit 106. The translated signals may then obtain a desired response from aftermarket head unit 106.

In certain circumstances, when an OEM head unit is replaced by an aftermarket ("AM") head unit, setting values may be lost, and may need to be reinstalled. If the electronic circuitry in the aftermarket head unit needs to be adapted to become compatible with the vehicle into which the aftermarket head unit is being installed, or if the AM head unit communication protocol is different from that of a peripheral, a circuit compatibility adapter and/or a protocol translator may be required. If the AM head unit is not configured to provide a user with controls (GUI-based or otherwise) for changing the setting values, a user-control emulation app—e.g., an app that displays HVAC, or other, controls on the face of an aftermarket head-unit that may be required to operate selected peripherals within the vehicle and that may have previously been installed for display on the factory-installed head unit—may also be required.

Part of the solution to the above-described problem may include using a DATA BUS on the vehicle. FIG. 1 also shows a typical DATA BUS 112 on a vehicle. Some conventional vehicle systems may use a head unit replacement interface 114 for coupling a DATA BUS to aftermarket head unit 106. Head unit replacement interface 114 may preferably be used for adapting the circuitry of the aftermarket head unit to the needs of the particular vehicle into which the aftermarket head unit is installed and/or translating protocols for communicating with one or more vehicle peripherals, for changing/setting values of the vehicle's systems and/or for providing one or more user-control emulation app(s).

More specifically, each peripheral may have settings. The settings may have values that differ with one or more of vehicle model, peripheral model, driver identification, driver preference and any other suitable factor. The setting values may be resident in the peripheral module. The setting values may be resident in the OEM head unit. Head unit replacement interface 114 may be used to store protocols for translation signals to one or more peripherals, for storing the setting values and/or for storing user control emulation app.

The peripherals may include one or more of a video camera, a suite of video cameras, an electronic vehicle maintenance record, a digital video recorder, a seat comfort control module, a collision prevention module, a navigation module, an unattended occupant protection system ("UOPS") module, a vehicle drive train module, a cabin comfort system control module (which may control, for example, internal lighting, climate and any other suitable amenities), a suspension control module, a security control module, and any other suitable control module.

Figure 2:
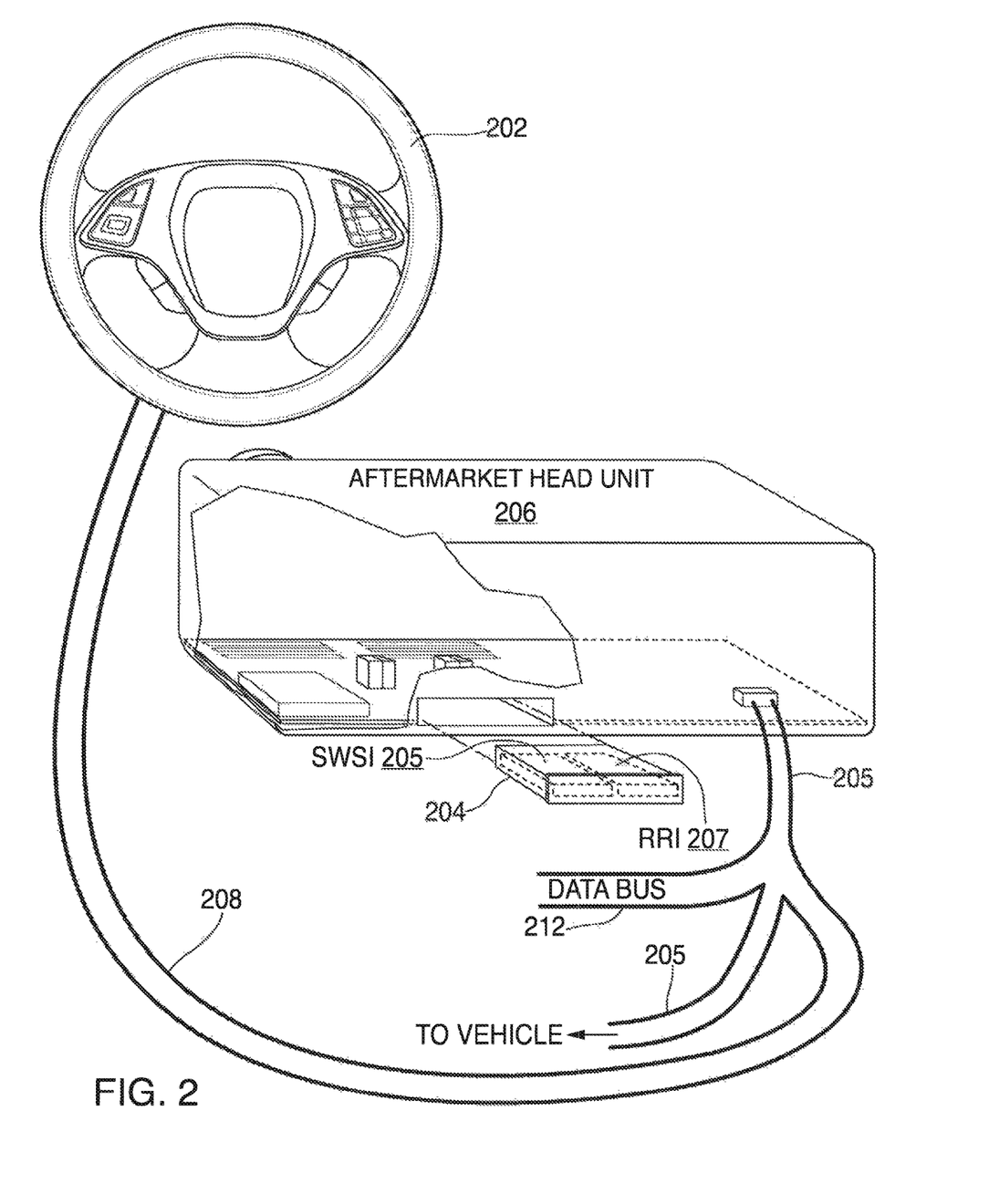
FIG. 2 shows an aftermarket head unit with a memory-configurable cartridge.

FIG. 2 shows an insertable, and preferably flashable—i.e., memory-configurable—cartridge 204 for insertion into aftermarket head unit 206. Also shown in FIG. 2 are steering wheel 202 and harness 208. Harness 208 preferably couples steering wheel controls on steering wheel 202 with a port on aftermarket head unit 206. FIG. 2 also shows DATA BUS (or other BUS) 212 which may also be coupled, by a wiring harness or otherwise, to aftermarket head unit 206.

Cartridge 204 may include one, two or more than two different modules. These modules include a steering wheel interface module 205 and a head unit replacement interface module 207. Following insertion of cartridge 204 into aftermarket head unit 206, steering wheel interface module 205 may preferably interface between steering wheel controls located on steering wheel 202 and aftermarket head unit 206. Following insertion of cartridge 204 into aftermarket head unit 206, head unit replacement interface module 207 may preferably interface between the DATA BUS 212 and aftermarket head unit 206.

Alternatively, cartridge 204 may include only one of steering wheel interface module 205 and head unit replacement interface module 207. It should be noted that, while cartridge 204 is shown as including two distinct modules—i.e., steering wheel interface module 205 and head unit replacement interface module 207—this showing of distinction is for illustrative purposes as the two can in fact be combined into a single piece of hardware. In some embodiments, both steering wheel interface module 205 and a head unit replacement interface module 207 may be combined as a single circuit and may, in fact be coupled to the circuitry within aftermarket head unit 206.

It should be noted that cartridge 204 may also be used to augment the functions present in the aftermarket head unit 206 or the vehicle into which head unit 206 is installed without departing from the scope of the invention. For example, cartridge 204 may be used to introduce functions currently not present in the vehicle such as WIFI, which is not available in many currently-marketed head units, forward video-switching, vehicle-to-vehicle communication, vehicle-to-infrastructure communication or any suitable additional function.

Figure 3:
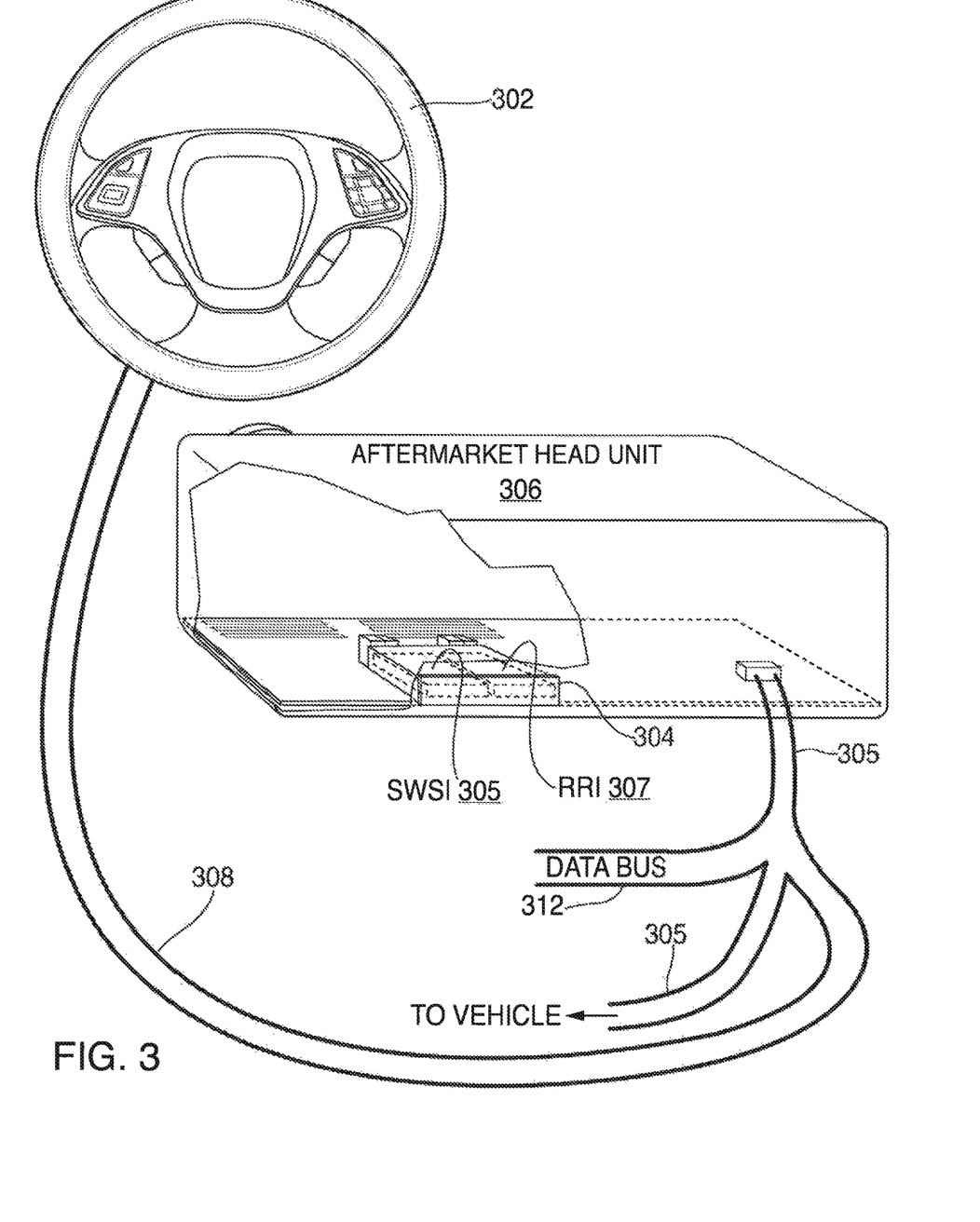
FIG. 3 shows a cartridge, according to certain embodiments, after insertion.

FIG. 3 shows that, after insertion, cartridge 304 uses steering wheel interface module 305 and a head unit replacement interface module 307 to interface between the steering wheel controls and the DATA BUS 312 and the aftermarket head unit 306, respectively. As noted above, steering wheel interface module 305 and a head unit replacement interface module 307 may be constructed as a single module (not shown) and not as two distinct modules. As such, the two modules may form a single module for either a dual purpose use—i.e., steering wheel control integration and head unit replacement integration—or a single one of the uses.

Figure 4A:
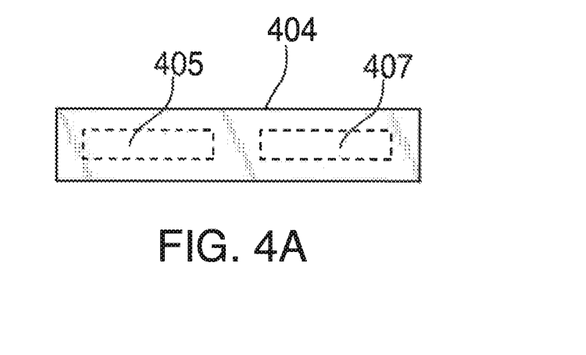
FIGS. 4A and 4B show a schematic rendering of ports, sockets, other device for coupling a standard head unit wiring harness, DATA BUS, plug, jack and/or other connection to connect to the relevant internal portions of an aftermarket head unit.
Figure 4B:
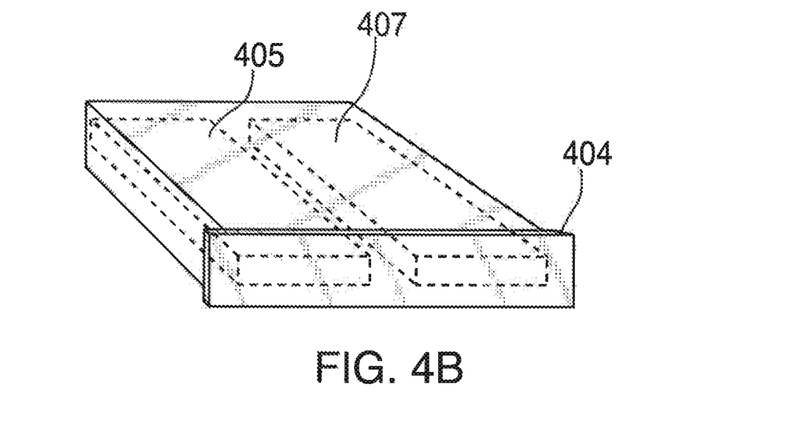

FIGS. 4A and 4B show that, in certain embodiments, ports 405 and 407 for coupling a standard (or other) head unit wiring harness and/or a connection associated with the DATA BUS to the relevant internal portions of aftermarket head unit 406 may preferably be incorporated into cartridge 404 itself. FIGS. 4A and 4B show the portion of cartridge 404 that remains flush with the body of the aftermarket head unit following insertion. It should be noted that in certain embodiments, the flashable cartridge may preferably be configured to physically lock into the body of the aftermarket head unit. Such a lock may include retractable, semi-retractable, or non-retractable projections 408 mounted on the exterior surface of the cartridge 404. Projections 408 may preferably be adapted for engaging corresponding detents (not shown) within the body of the aftermarket head unit. The engagement of projections 408 and the detents may preferably be augmented and/or reinforced with an engagement formed from a circuit board portion of the module and/or cartridge. This circuit board portion of the module and/or cartridge may engage a receptacle within the aftermarket head unit (such as receptacles 203 and receptacles 303, shown schematically at FIGS. 2 and 3). The engagement between the circuit board portion of the module and the receptacle may increase the overall strength of the locking between cartridge 404 and the aftermarket head unit.

Figure 5:
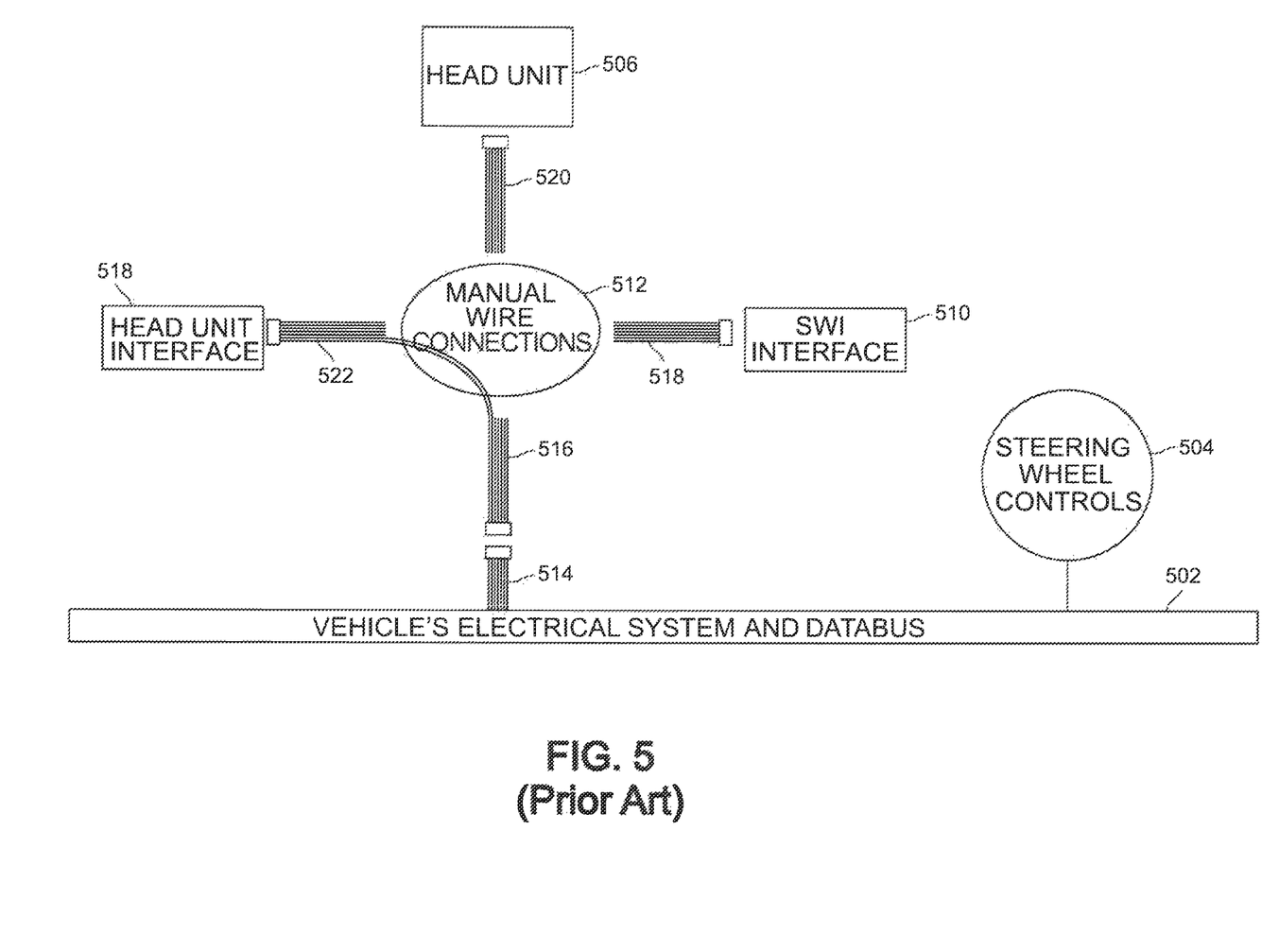
FIG. 5 shows a schematic rendering of the wiring of a prior art environment of an aftermarket head unit, with prior art interfacing device(s) harnesses and requisite manual connections.

FIG. 5 shows a schematic rendering of the wiring of a prior art environment of an aftermarket head unit, with prior art interfacing device(s) harnesses and requisite manual connections. Such prior art systems may involve the vehicle's electrical system and databus 502, steering wheel controls 504, a head unit 506, a steering wheel interface 510, manual wire connections 512, a head unit interface 518, and different sets of wire 516, 518, 520 and 522 which all, or substantially all, connect at manual wire connections 512.

Each of sets of wire 516, 518, 520 and 522 may also include a connector for connecting to individual components with pre-determined pin connections. For example, wires 516 may include a connector for connecting to wires 514 (associated with vehicle's electrical system and databus 502). Wires 518 may include a connector for connecting to SWI interface 510. Wires 520 may include a connector for connecting to head unit 506 and wires 522 may include a connector for connecting to head unit interface 518.

FIG. 5 emphasizes the amount of manual connections 512 necessary in order to conventionally add aftermarket components such as head unit interface 518 and steering wheel control interface 510. It should be noted that, while the majority of these interconnections are typically required to be formed manually, some interconnections may be pre-formed such as the interconnection shown from wires 516 to 522. In such instances, connector 516/522 may preferably be combined in a single connector which may or may not be sold together with head unit interface 518.

Figure 6:
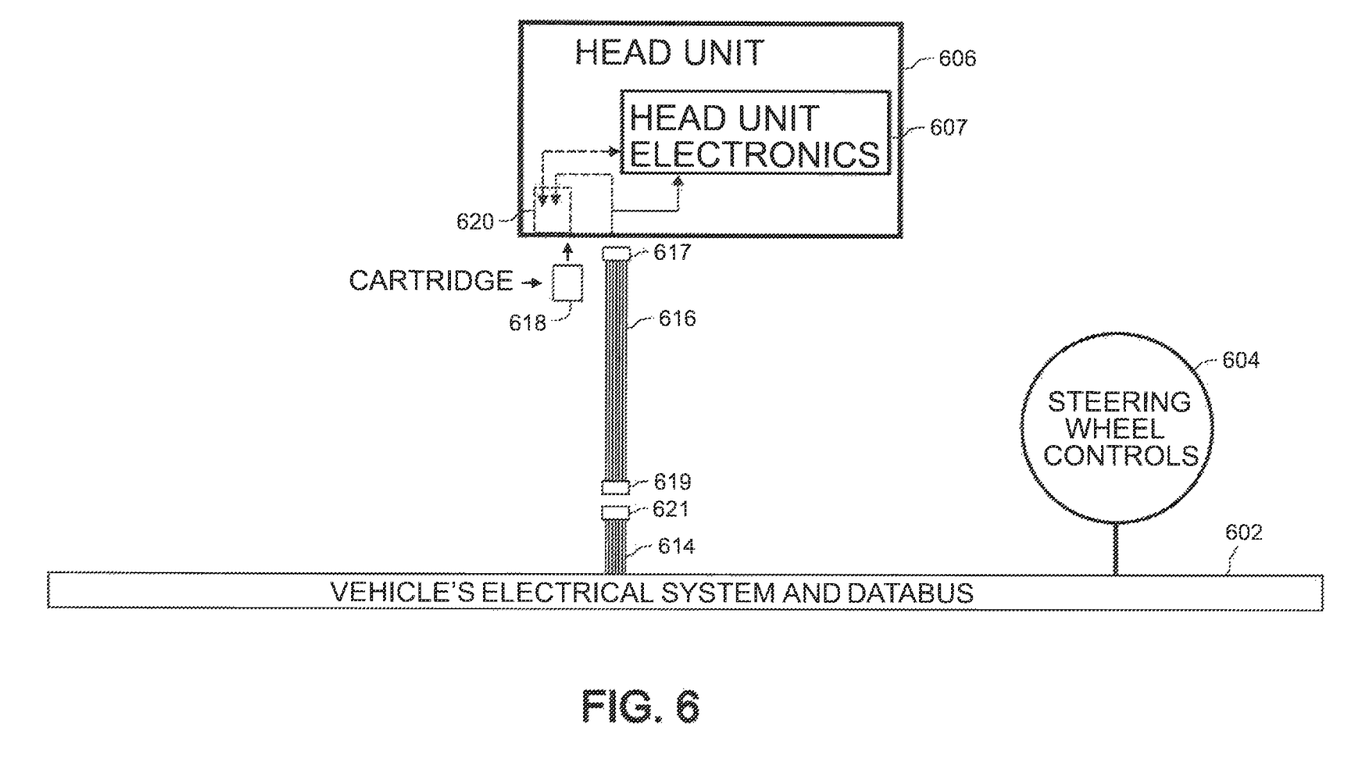
FIG. 6 shows an exemplary arrangement of the wiring of a cartridge-based system according to certain embodiments.

FIG. 6 shows an exemplary arrangement of the wiring of a cartridge-based system according to certain embodiments. Cartridge-based system shows cartridge 618. Cartridge 618 may preferably be used to add head unit interface functionality and steering wheel control interface functionality to head unit 606. Head unit interface functionality may enable successful communication between head unit electronics 606 and vehicle-based electronic components that are in electrical communication with the vehicle's electrical system and databus 602. Steering wheel control interface functionality may enable successful communication between vehicle-based steering wheel controls 604 and head unit electronics 607.

It should be noted that, in embodiments a cartridge-based system, preferably no manual wiring would be required. Specifically, the vehicle's electrical system and databus 602 may preferably be pre-coupled—i.e., sold as such—by wire 614 to connector 621. Connector 621 may be pre-coupled to connector 619 which is pre-coupled, through wires 616 to connector 617. Connector 617 is attached, at connector 617 to the head unit. Such connectors are connectable such that these connectors may simply be snapped to a mating connector without the need to perform time- and resource consumptive manual wiring.

FIG. 6 shows further that, upon insertion of connector 617, the signals that previously were routed directly to head unit electronics from vehicle's electrical system and databus 602, are then rerouted through cartridge 620, and then to head unit electronics 607. As such signals that are passed between head unit electronics 607 and vehicle's electrical system and databus 602 may preferably be routed through cartridge 618. Therefore, cartridge 618 can be used to add head unit interface functionality and steering wheel control interface functionality, otherwise condition any of the signals passed between the vehicle electronic components and the head unit electronic components, absent any need for manual wiring.

Figure 7:
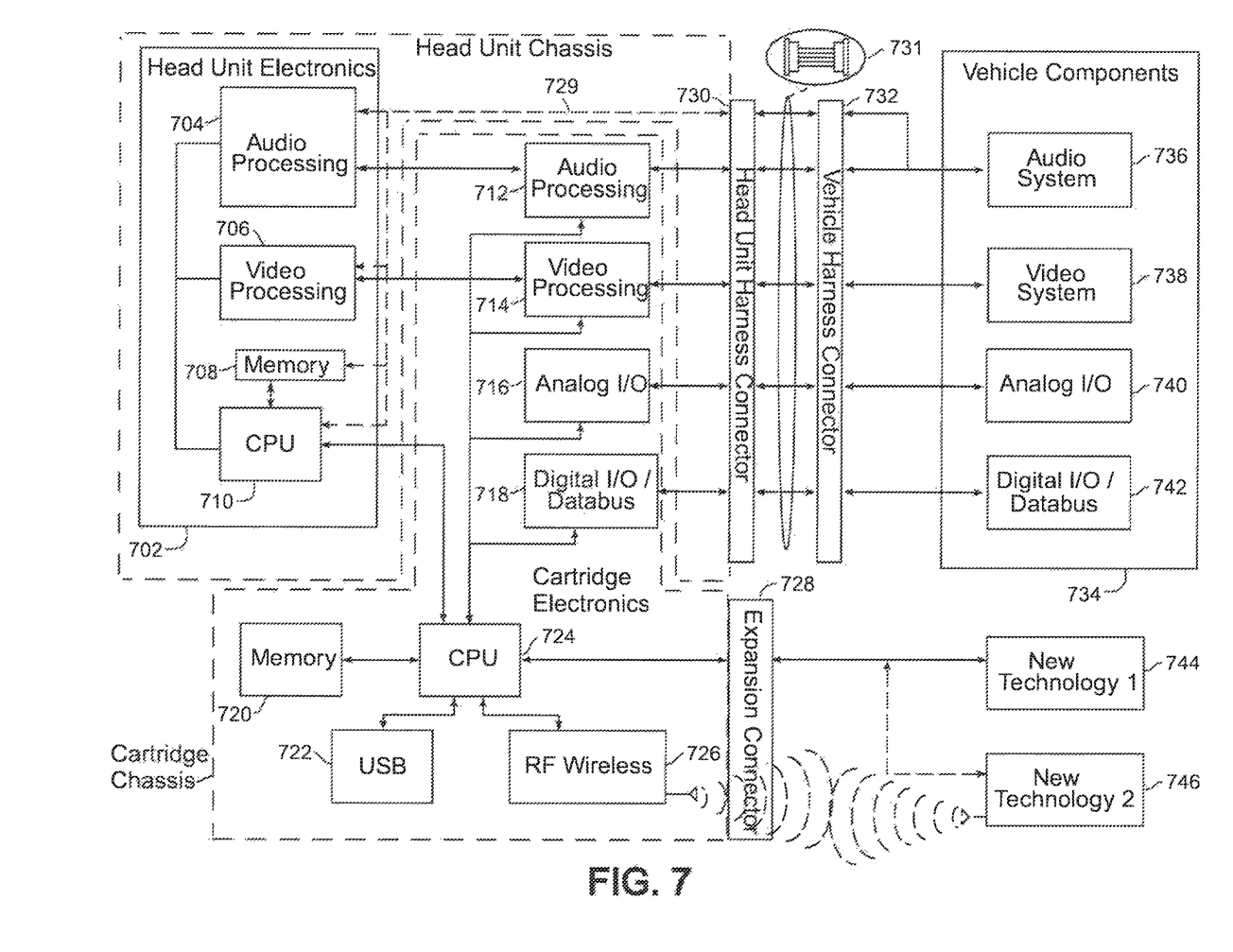
FIG. 7 shows a schematic rendering of the cartridge, in the environment of an aftermarket head unit, according to certain embodiments.

FIG. 7 shows a schematic rendering of the cartridge, in the environment of an aftermarket head unit, according to certain embodiments. In general—FIG. 7 shows a schematic rendition of vehicle electronic components, head unit electronics, a head unit chassis and cartridge electronics, and exemplary interaction therebetween, according to certain embodiments. It should be noted that the interactions between the vehicle electronic components, head unit electronics and cartridge electronics are described below in exemplary fashion. In general, the vehicle electronic components provide signals to and from the head unit—as needed for the functioning of the vehicle in conjunction with the head unit. In most embodiments, the cartridge electronics lie in the signal path between the vehicle components and the aftermarket head unit components. The cartridge electronics operate to interface/condition/process the signals that are transmitted between the vehicle components and the aftermarket head unit components. The cartridge electronics may also play a role in the transfer of power between the vehicle and/or vehicle components and the aftermarket head unit.

Vehicle electronic components may preferably include an audio system 736, a video system 738, an analog I/O (input/output system) 740, and a digital I/O databus 742.

Audio system 736 may be an Original Equipment Manufacturer (OEM) system or an After Market (AM) system. Audio system 736 may be partially an Original Equipment Manufacturer (OEM) system and partially an After Market (AM) system. Audio system 736 may preferably include, and process signals associated with, devices such as amplifiers, speakers, audio sources like On-Star®, telematics, microphones, CD players, DVD players, entertainment devices such as iPhones® or similar devices, Bluetooth-enabled or otherwise-enabled calling devices.

FIG. 7 shows, schematically, signals generated by, and transmitted to, vehicle components. These signals are shown as being transmitted from/to the vehicle harness connector 732. These signals are shown as being transmitted through vehicle/head unit harness 731 and through head unit harness connector 730.

It should be noted that vehicle/head unit harness 731 should preferably be configured to accommodate transmission of signals relating to all the functions that have been described with respect to audio system 736 as well signals relating to all the functions that will be described relating to all the functions associated with video system 738, analog I/O 740, digital I/O/databus 742, as well as any other suitable vehicle component functions that have not been described in detail herein.

In addition, harness 731 should preferably be configured to power (connection not shown individually in FIG. 7) the cartridge and/or head unit. The vehicle preferably provides the source of power for the cartridge and/or head unit. In certain embodiments, power for the aftermarket head unit may bypass the cartridge and be directly coupled from the vehicle to power the aftermarket head unit. In such an embodiment, power may be transferred from the aftermarket head unit to the cartridge, or directly from the vehicle to the cartridge.

In some embodiments, head unit speaker outputs or any of the head unit outputs to vehicle components could preferably directly connect to the vehicle components—bypassing the cartridge, as shown schematically at line 729. It should be noted that any of the signals exchanged between vehicle components 738-742 and head unit electronics may be passed through line 729 (which shows schematically one or more electronic connections between vehicle components 738-742 and head unit electronics 704-710.) As such, when the cartridge is not installed, there is still communication vehicle between components 738-742 and head unit electronics may be passed through line 729. When the cartridge is installed, it preferably captures and conditions the signals between the electronic components in the vehicle and the electronic components in the head unit to add functionality as needed to the head unit.

Preferably—any signals that may be needed for the vehicle from the head unit either, in their raw form or conditioned, and any signals that may be needed for the head unit from the vehicle, in their raw form or conditioned, may initially be transmitted through the circuit board in the head unit and then to the cartridge. Following conditioning by the cartridge, one or more of the signals may be transmitted to the head unit.

While this harness configuration of vehicle/head unit harness 731 has been described herein as a single harness—it should be noted that the vehicle/head unit harness 731 may take the form of two or more than two harnesses. For example, harness 731 may be split into a 20- and 24-pin connector to provide all the appropriate connectivity between connector 730 and connector 732. Such a connection should preferably support all the power needs for the aftermarket head unit, the speakers out signal and the audio that is not at speaker level, such as chimes signals, all other relevant audio signals, all other relevant video signals, and any other suitable digital and analog signals, etc.

Video system 738 may include wholly OEM or wholly AM systems. In certain embodiments, video system 738 may include partially OEM and partially AM systems. Such systems may process signals associated with forward-facing cameras, back-up cameras, cameras within a vehicle, a video feed for rear-seat or other-seat entertainment, multiple 360-degree cameras whereby the outputs are stitched-together for forming a 360-degree birds-eye-view of the vehicle, and DVD players and/or systems.

Analog I/O (input/output system) 740 may process analog signals such as steering wheel control signals, illumination ON/OFF signals (which indicate whether the external lights are ON or OFF in order to toggle the internal lighting system to a bright or a dim setting), reverse signals that indicate that a vehicle is currently in reverse, a vehicle speed indicator, a parking brake ON/OFF indicator, climate control signals or any other suitable analog signals within a vehicle.

In certain embodiments, an aftermarket head unit may be used to recreate, implement and display climate controls for a vehicle. Such climate control integration into an aftermarket head unit may preferably control air mixture hardware such as vent flaps and other related climate control hardware.

The harness, according to certain embodiments, may use a single connector or multiple connectors at the head unit connection point and may use a single connector or multiple connectors at the vehicle connection point.

Digital I/O/databus 742 may process digital signals relating to any relevant data messaging within the vehicle. Such signals may be transmitted, within the vehicle, on a relevant bus which may include, but not be limited to, a CAN bus, a LIN bus, an NMOST bus, and/or an A2B bus.

Cartridge components may include an audio processing block 712, a video processing block 714, an analog I/O block 716, a digital I/O databus block 718 as well as on-board memory 720, a USB port (or other suitable port) 722, an RF wireless communication block 726 and a CPU 724.

It should be noted that wireless connections to and from the cartridge may be supported by RF wireless communication block 726. Such wireless connectivity may preferably be updatable by updating the flashable cartridge. Accordingly, such connectivity may be used to implement, and/or update, vehicle-to-vehicle communication, vehicle-to-infrastructure communication or any other preferably wireless communication. In addition, RF wireless communication block 726 may be the actual point of contact for updating the flashable cartridge from a remote source.

Certain other updates may require a completely new cartridge. For example, a cartridge that is being updated to implement a 5G communication protocol may preferably require different internal hardware as well as updates to the software. One possible update to provide a flashable 5G-compatible cartridge may include adding a 5G chip to the motherboard of the cartridge hardware.

Cartridge components may operate in the exemplary fashion set forth below.

The signal transmission and processing blocks (712-718) in the cartridge may preferably interface/condition/process all signals to and/or from the vehicle to the head unit. Specifically, the audio and video signals gets passed through the cartridge and conditioned, such that the signals are either translated or otherwise conditioned for use on the other side of the cartridge. Thus, all the signals that are needed for the vehicle (and the head unit) may be transmitted through the cartridge. These signals may be unintelligible, in their raw form, by the aftermarket head unit or, with respect to signals transmitted by the aftermarket head unit, by the vehicle. These signals may be captured and conditioned by the cartridge for use by the aftermarket head unit and the vehicle, as needed.

Alternatively, and as described above, there may be certain signals that bypass the cartridge.

Such interfacing/conditioning/processing may include all the various functionalities, inter alia, set forth above in connection with head unit replacement interface and steering wheel control interface.

Audio processing block 712 may, in certain circumstances, receive a message from CPU 724. The message may include an instruction to generate an audible alert, such as a door chime. The message may be issued by one or more vehicle components. Such a message may have, for example, been received by CPU 724 via digital I/O/databus 718 further via head unit harness connector 730, harness 731, vehicle harness connector 732 and originating at either digital I/O databus 742 and/or audio system 736.

Audio processing block 712 may then prompt the head unit audio processing at 704 to cause the chime signal to be emitted. It should be noted that any of the aftermarket head unit electronics could preferably be controlled by the cartridge, or by using some combination of the cartridge and the vehicle system.

In certain embodiments, the cartridge may preferably condition the format and/or output level of the audio signals received from the aftermarket head unit. In particular, a vehicle that includes a factory amplifier may require that the aftermarket head unit set the volume level of the output to a predetermined, fixed, volume level, and then transmit the position of the volume knob, or other volume setting indicator, on the aftermarket head unit, to the external, OEM, amplifier. In embodiments set forth herein, however, the cartridge may preferably provide, inter alia, such conditioned format/audio output level. In certain of such embodiments, the cartridge may preferably receive, via a wired connection, such as a micro USB connection, or other suitable connection such as a flashable wireless connection, firmware that enables the cartridge to set the audio characteristics of the aftermarket head unit to maximize the audio output for the vehicle into which the head unit is installed. To reiterate, these characteristics may include the audio output level and the audio output format associated with the original premium audio settings for the OEM amplifier.

In certain embodiments, the cartridge may allow be installed such that the cartridge includes identification information corresponding to the aftermarket head unit. Upon installation, the cartridge may preferably take control of, either temporarily or permanently, the aftermarket head unit display screen. In such embodiments, the cartridge may prompt a user to information corresponding to the vehicle into which the aftermarket head unit is installed. In certain embodiments, upon a retrieval of the vehicle information, the cartridge may preferably set the internal settings of the aftermarket head unit to correspond to the vehicle into which the aftermarket head unit is installed.

The foregoing, exemplary, embodiments of systems, architecture and functionalities may form only a part of the embodiments set forth herein.

It should be noted that, in preferred embodiments, following deployment of the cartridge within the aftermarket head unit chassis, CPU 726 preferably obtains a processor-to-processor communication with CPU 710. This CPU 710 to CPU 726 communication, where both CPUs effectively form a dual-CPU motherboard through the hard-wired connection between the two CPUs, enables a higher-level communication between the two CPUs than has been found in conventional communication between CPUs on head unit replacement/steering wheel control modules. In certain embodiments the higher-level communication between the CPUs may enable each CPU to identify itself to the other CPU. Such a CPU-CPU connection may preferably implement such communications protocols as Serial Peripheral Interface Bus (SPI), a synchronous serial communication interface specification used for short distance communication, primarily in embedded systems, an Ethernet connection, a PCI (Peripheral Component Interconnect) Express connection, an SDIO (Secure Digital Input Output) connection or other suitable, relatively high-speed connection.

In certain embodiments, such a CPU-CPU connection may be initialized by a CPU-CPU communication that identifies one or more of the CPUs to the other CPU. Such an initialization may enable display of a screen on an aftermarket head unit display that allows a user to further configure the cartridge to the correct vehicle, the correct settings, or any other suitable configuration(s).

In one exemplary embodiment, such a connection preferably enables analog and digital audio signal communication between the two (or more) CPUs. In addition, such a connection preferably enables a video signal conversion of any video signal to be effected between the two CPUs.

Also, climate controls that were previously controlled by the CPU in the aftermarket head unit (or in the vehicle) could preferably be controlled by a combination of the CPU resident in the cartridge (which could introduce and administer a customized climate control screen) and the CPU resident in the aftermarket head unit. In certain embodiments, a customized climate control screen may preferably emulated and grafted into the operating system of the head unit. For this to be enabled—to provide the necessary bandwidth for supporting the customized climate control screen—the cartridge functions as an extension of the operating system of the aftermarket head unit rather than functioning as a peripheral. Such functionality can typically not be implemented over a four-pin plug connection, nor can this be implemented over a single-serial connection. Rather, such climate control emulation may only be provided and adapted to the user interface to present and emulate an OEM graphical user interface associated with the vehicle using one of the relatively high-speed CPU-CPU interconnections described above. For some embodiments, it is possible for the cartridge electronics to be mapped into the aftermarket head unit CPU's memory space. Such mapping would enable the aftermarket head unit CPU to readily emulate the vehicle specific climate control interfaces, or other information, that had been initially downloaded to the cartridge. Such mapping could most efficiently be implemented with the relatively high-speed CPU-CPU interconnections described above. This is because the embodiments of the cartridge enable a direct communication between the wiring of the aftermarket head unit and the vehicle which was, heretofore, unavailable. Furthermore, the expansion capability, set forth in greater detail below in the portion of the specification corresponding to new technology blocks 744 and 746, provides a port for connecting additional and/or future-developed technologies.

In certain embodiments, it should be noted that the CPU on the cartridge may act to take over the controlling functions, or the majority of the controlling functions, of the aftermarket head unit CPU. In certain embodiments, the aftermarket head unit may preferably be equipped with only a minimal, thin-client, CPU as opposed to a fully-functional CPU. In such embodiments, the CPU on the cartridge can preferably provide the necessary functionality to, upon installation, take over the CPU functions, or the majority of the CPU functions, of the aftermarket head unit. In alternative embodiments, a certain cartridge may be equipped to provide a 5/1 amplifier system to configure different numbers of power channels.

New technology blocks 1 and 2, as shown at 744 and 746, may involve wired or wireless communication lines. New technology blocks 744 and 746 may preferably be used for updating functionality of the aftermarket head unit. In addition such new technology blocks 744 and 746 may enable the ability to add additional external hardware-elements to an already-existing cartridge. For example, V2X (Vehicle to Infrastructure) technology can be added, using an exemplary 5G or DSRC radio transceiver, to an existing aftermarket head unit via new technology blocks 744 and/or 746 without the need to replace the aftermarket head unit (or the already-existing cartridge).

Some embodiments may include updating the firmware or the software of the cartridge or the aftermarket head unit in support of future-developed technology. For example, such new technology blocks 744 and 746 may enable a user to add an external hardware component to the cartridge in a way that enhances the cartridges functionality. In certain embodiments, new technology blocks 744 and 746 may enable the addition of a new socket to the cartridge. Such a new socket may enable the cartridge to communicate by a different protocol than the cartridge was able at the time of its original in-use date.

Additionally, the replaceable nature of the cartridge architecture enables further technological advances to be incorporated into the existing aftermarket head unit via future versions of the cartridge which can incorporate the latest hardware-elements to support these new technologies.

Figure 8:
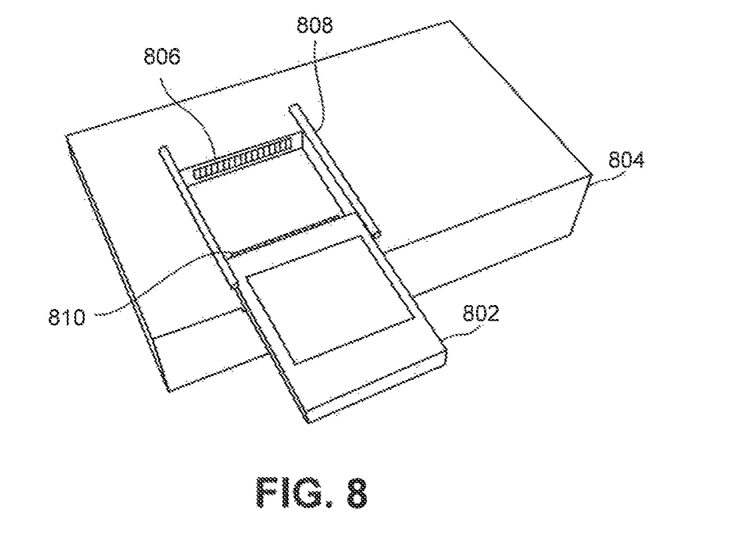
FIG. 8 shows an exemplary arrangement for a cartridge-based system according to certain embodiments.

FIG. 8 shows an exemplary architecture for a cartridge-based system according to certain embodiments. The architecture includes cartridge 802 and aftermarket head unit 804.

Cartridge 802 preferably includes connecting pins 810. Upon insertion of cartridge 802 in head unit 804, connecting pins 810 preferably are inserted in, and connect to, contacts within connection slots 806. In some embodiments, rails 808 may preferably be disposed on head unit 804 to secure cartridge 802 to head unit 804. In certain embodiments, additional locking mechanisms such as a detents or screws, may be provided to ensure a tight, and secure, fit between cartridge 802 and head unit 804. In some embodiments, flaps (not shown) may extend from the side of cartridge 802 to allow for cartridge 802 to be screwed into head unit 804 following insertion into head unit 804.

One of ordinary skill in the art will appreciate that the elements and steps shown and described herein may be utilized and/or performed in other than the recited system and/or order and that one or more elements illustrated may be optional. The methods of the above-referenced embodiments may involve the use of any suitable elements, elements, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, systems and methods for providing an aftermarket head unit interface and protocol converter cartridge have been provided. Persons skilled in the art will appreciate that the present invention can be practiced by other than the described embodiments, which are presented for purposes of illustration rather than of limitation. The present invention is limited only by the claims that follow.

What is claimed is:

1. An aftermarket integration cartridge for use with an aftermarket component installed in a vehicle, the aftermarket integration cartridge installed on the aftermarket component and supporting communication between the aftermarket component and at least one other electronic component installed in the vehicle, the aftermarket integration cartridge comprising:
    a processing unit configured to
        capture and condition a signal transmitted by at least one component selected from a group consisting of the aftermarket component and the at least one other electronic component installed in the vehicle to facilitate communication between the aftermarket component and the at least one other electronic component, and
        augment functionality provided by the aftermarket component.

2. The aftermarket integration cartridge of claim 1, wherein the processing unit is further configured to provide a user interface for configuring at least one setting of the aftermarket integration cartridge.

3. The aftermarket integration cartridge of claim 2, wherein the processing unit is configured to provide the user interface to the aftermarket component for display on a screen installed in the vehicle.

4. The aftermarket integration cartridge of claim 1, wherein the aftermarket integration cartridge is removably installed on the aftermarket component via a slot within the aftermarket component.

5. The aftermarket integration cartridge of claim 1, further comprising flashable memory for reconfiguring the aftermarket integration cartridge.

6. The aftermarket integration cartridge of claim 5, wherein the flashable memory is flashable through the aftermarket component.

7. The aftermarket integration cartridge of claim 1, wherein the processing unit is configured to capture the signal by receiving the signal from the aftermarket component.

8. The aftermarket integration cartridge of claim 1, further comprising a port and wherein the processing unit is configured to capture the signal by receiving the signal at the port.

9. The aftermarket integration cartridge of claim 1, wherein the aftermarket component is a head unit.

10. The aftermarket integration cartridge of claim 1, wherein the signal is a wireless signal.

11. The aftermarket integration cartridge of claim 1, further comprising an expansion connector for coupling an external device to the aftermarket integration cartridge, the external device including additional hardware to augment functionality provided via at least one of the aftermarket integration cartridge and the aftermarket component.

12. An aftermarket integration cartridge for use with an aftermarket component installed in a vehicle, the aftermarket integration cartridge removably coupled with the aftermarket component and supporting communication between the aftermarket component and at least one other electronic component installed in the vehicle, the aftermarket integration cartridge comprising:
    a processing unit configured to
        capture and condition a signal transmitted by at least one component selected from a group consisting of the aftermarket component and the at least one other electronic component installed in the vehicle to facilitate communication between the aftermarket component and the at least one other electronic component, and
        provide a user interface for configuring at least one setting of the aftermarket integration cartridge via a screen installed in the vehicle.

13. The aftermarket integration cartridge of claim 12, wherein the screen installed in the vehicle is a screen of the aftermarket component.

14. The aftermarket integration cartridge of claim 12, further comprising a first port for receiving signals from a data bus included in the vehicle and a second port for receiving signals from a head unit harness.

15. The aftermarket integration cartridge of claim 12, further comprising a port for coupling with a handheld device.

16. The aftermarket integration cartridge of claim 12, further comprising a mechanical mechanism for locking the aftermarket integration cartridge to the aftermarket component.

17. An aftermarket integration cartridge for use with an aftermarket component installed in a vehicle, the aftermarket integration cartridge supporting communication between the aftermarket component and at least one other electronic component installed in the vehicle, the aftermarket integration cartridge comprising:
    a processing unit configured to
        capture and condition a signal transmitted by at least one component selected from a group consisting of the aftermarket component and the at least one other electronic component installed in the vehicle to facilitate communication between the aftermarket component and the at least one other electronic component, and
        augment functionality provided by the aftermarket component.

18. The aftermarket integration cartridge of claim 17, further comprising a mechanical mechanism for locking the aftermarket integration cartridge to the aftermarket component.

19. The aftermarket integration cartridge of claim 17, wherein the processing unit is further configured to provide a user interface for configuring at least one setting of the aftermarket integration cartridge.

20. The aftermarket integration cartridge of claim 17, wherein the aftermarket integration cartridge is removably installed on the aftermarket component via a slot within the aftermarket component.

\* \* \* \* \*